(12) United States Patent
Chen (10) Patent No.: US 10,713,977 B1
(45) Date of Patent: Jul. 14, 2020

(54) ANTI-COUNTERFEIT SECURITY VERIFICATION METHOD AND DEVICE USING QUANTUM DOTS

(71) Applicant: National Tsing Hua University, Hsinchu (TW)

(72) Inventor: Hsueh-Shih Chen, Hsinchu (TW)

(73) Assignee: National Tsing Hua University (TW)

( * ) Notice: Subject to any disclaimer, the term of this patent is extended or adjusted under 35 U.S.C. 154(b) by 0 days.

(21) Appl. No.: 16/239,416

(22) Filed: Jan. 3, 2019

(30) Foreign Application Priority Data

Dec. 19, 2018 (TW) .............................. 107145933 A (51) Int. Cl.
*G09F 3/02* (2006.01)
*G09F 3/00* (2006.01)
*B42D 25/36* (2014.01)
*G06K 19/077* (2006.01)

(52) U.S. Cl.
CPC .......... *G09F 3/0297* (2013.01); *B42D 25/36* (2014.10); *G06K 19/07707* (2013.01); *G09F 3/0294* (2013.01)

(58) Field of Classification Search
None
See application file for complete search history.

(56) References Cited

U.S. PATENT DOCUMENTS

| | | | | |
|---|---|---|---|---|
| 9,327,542 B2* | 5/2016 | Kecht | .................... | B42D 25/29 |
| 9,731,541 B2* | 8/2017 | Minamikawa | ........ | G09F 3/0294 |
| 10,535,212 B2* | 1/2020 | Dobrinsky | ............... | G07D 7/12 |
| 2002/0066543 A1* | 6/2002 | Lilly | ...................... | B41M 3/144 162/140 |
| 2012/0174447 A1* | 7/2012 | Vincent | ................ | B42D 25/355 40/453 |
| 2015/0273928 A1* | 10/2015 | Minamikawa | .......... | B32B 27/32 283/81 |
| 2015/0328915 A1* | 11/2015 | Kecht | .................... | B42D 25/29 250/459.1 |
| 2018/0174389 A1* | 6/2018 | Dobrinsky | ............. | G01N 21/64 |
| 2018/0345713 A1* | 12/2018 | Weiss | ...................... | C09D 11/50 |
| 2019/0095668 A1* | 3/2019 | Gaathon | .............. | G06K 7/1417 |
| 2019/0226990 A1* | 7/2019 | Reinhardt | ............ | B42D 25/378 |
| 2019/0257754 A1* | 8/2019 | Everett | ............. | G01N 21/6428 |
| 2019/0302333 A1* | 10/2019 | Hebrink | ................ | G02B 5/287 |

* cited by examiner

*Primary Examiner* — Thomas R Artman (57) ABSTRACT

Disclosures of the present invention describe an anti-counterfeit security verification method and device using quantum dots, wherein the anti-counterfeit security verification device consists of a base, a plurality of receiving recesses formed on the base, and a plurality of optical members. After being illuminated by a short-wavelength light, the optical members irradiate a plurality of photoluminescent light, and each of the photoluminescent lights comprises at least one wavelength value, one (x, y) coordinate position, one value of integrated photoluminescence intensity area, one photoluminescence color, and one color scale value. Particularly, the present invention develops a 3D pattern and a 2D color-scale pattern in a three-dimensional coordinate system and a two-dimensional coordinate system, such that the 2D color-scale pattern and the 3D pattern are respectively used as an information carrying label and a security verification, or respectively adopted as the security verification and the information carrying label.

6 Claims, 9 Drawing Sheets

FIG. 1A
(Priro Art)

FIG. 1B
(Priro Art)

FIG. 1C
(Priro Art)

ANTI-COUNTERFEIT SECURITY VERIFICATION METHOD AND DEVICE USING QUANTUM DOTS

BACKGROUND OF THE INVENTION

1. Field of the Invention

The present invention relates to the technology field of anti-counterfeit labels and security verification thereof, and more particularly to an anti-counterfeit security verification method and device using quantum dots.

2. Description of the Prior Art

Anti-counterfeit technology is developed for arresting the selling of a counterfeit product manufactured without the permission of the owner of a correspondingly original product. Nowadays, there are many anti-counterfeit methods developed, including chemical anti-counterfeit, physical anti-counterfeit, anti-counterfeit printing ink, anti-counterfeit digital code, anti-counterfeit structure, and anti-counterfeit package.

Quantum dots (QDs) fiber and fabric weaved by using the QDs fibers are a newly-developed anti-counterfeit technology. China patent publication No. CN106245129A has disclosed a nanometer luminescent fiber and a fabrication method thereof The method for fabricating the nanometer luminescent fiber(s) comprises following steps:
(1) adding a plurality of quantum dots (QDs) into an organic solvent for obtaining a QDs solution;
(2) adding at least one additive made of polymer material into the QDs solution, so as to obtain a QDs polymeric solution; and
(3) producing fine fibers from the QDs polymeric solution by using an electrostatic spinning apparatus.

Figure 1A:
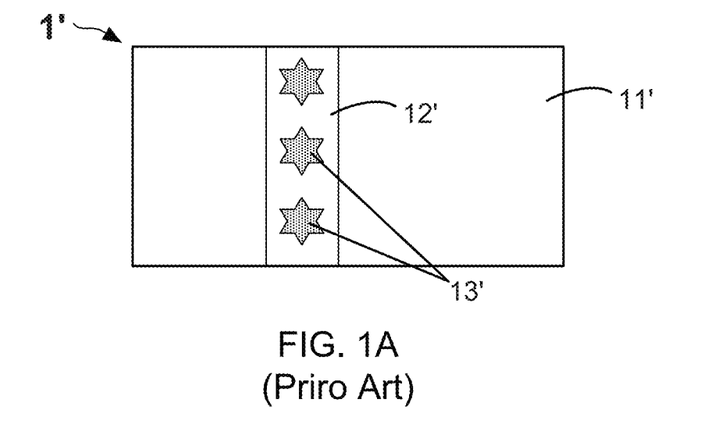
FIG. 1A shows a first top-view diagram of an anti-counterfeit QDs fabric.
Figure 1B:
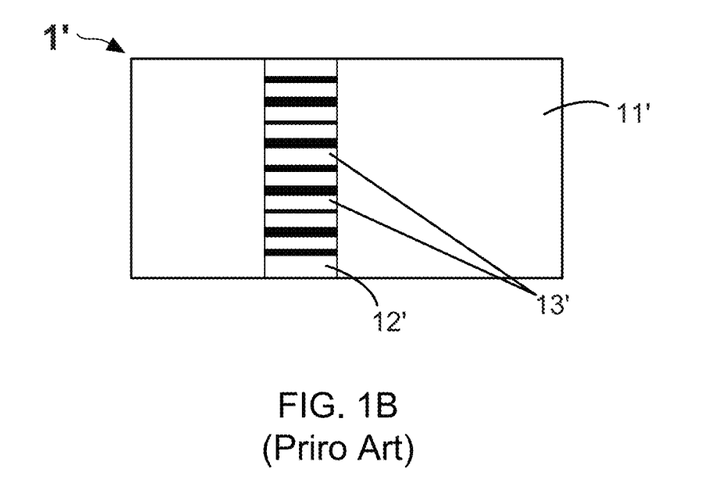
FIG. 1B shows a second top-view diagram of the anti-counterfeit QDs fabric.
Figure 1C:
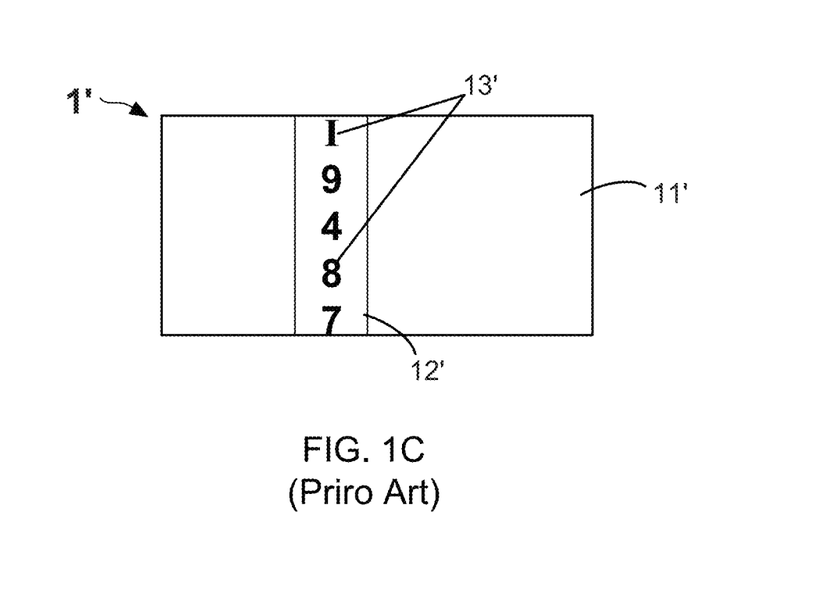
FIG. 1C shows a third top-view diagram of the anti-counterfeit QDs fabric.

Please refer to FIG. 1A, FIG. 1B and FIG. 1C, there are three corresponding top-view diagrams of three anti-counterfeit QDs fabrics provided. As FIG. 1A shows, an anti-counterfeit QDs fabric comprises: a main body 11' and a fabric band 12' provided with an anti-counterfeit pattern 13' thereon. The main body 11' is a paper substrate or a fabric substrate, and the fabric band 12' having the anti-counterfeit pattern 13' is weaved from the QDs fibers. From FIG. 1A, it is found that the anti-counterfeit pattern 13' has a geometrically-patterned top view. However, FIG. 1B depicts that the anti-counterfeit pattern 13' is a 1D barcode, and FIG. 1C shows that the anti-counterfeit pattern 13' is a combination of at least one alphabet and at least one numeric number. Moreover, the anti-counterfeit pattern 13' can also be particularly designed to a 2D barcode.

Because the anti-counterfeit pattern 13' can be provided by a form of 1D barcode, 2D barcode, or a specific label comprising color bars, blanks, alphabets, and numeric numbers, the anti-counterfeit pattern 13' made of QDs fibers has become an attracting anti-counterfeit technology. However, owing to the limitation of the constituting structure, both the QDs 1D barcode or the QDs 2D barcode can merely carry one of product information, the anti-counterfeit identification or security verification, but fails to simultaneously carry the product information, the anti-counterfeit identification and security verification.

From above descriptions, it is clear that how to design and manufacture a QDs label simultaneously having the functions of anti-counterfeit identification and security verification has become an important issue. In view of that, inventors of the present application have made great efforts to make inventive research and eventually provided an anti-counterfeit security verification method and device using quantum dots.

SUMMARY OF THE INVENTION

The primary objective of the present invention is to provide an anti-counterfeit security verification method and device using quantum dots, wherein the anti-counterfeit security verification device consists of a base, a plurality of receiving recesses formed on the base, and a plurality of optical members. After being illuminated by a short-wavelength light, the optical members irradiate a plurality of photoluminescent light, and each of the photoluminescent lights comprises at least one wavelength value, one (x, y) coordinate position, one value of integrated photoluminescence intensity area, one photoluminescence color, and one color scale value. Particularly, the present invention develops a 3D pattern and a 2D color-scale pattern in a three-dimensional coordinate system and a two-dimensional coordinate system, such that the 2D color-scale pattern and the 3D pattern are respectively used as an information carrying label and a security verification, or respectively adopted as the security verification and the information carrying label.

In order to achieve the primary objective of the present invention, the inventor of the present invention provides an embodiment for the anti-counterfeit security verification method using quantum dots, comprising following steps:
(1) using a short-wavelength light to illuminate an anti-counterfeit security verification device, so as to receive a plurality of photoluminescent lights from the anti-counterfeit security verification device; wherein the anti-counterfeit security verification device comprises a base provided with a plurality of receiving recesses thereon, and a plurality of optical members are respectively disposed in the plurality of receiving recesses;
(2) applying a 2-dimensional coordinate identification process, a photoluminescence color identification process, and a calculation of integrated photoluminescence intensity area to the plurality of photoluminescent lights, so as to obtain a plurality of (x,y) coordinate positions, a plurality of wavelength values, a plurality of values of integrated photoluminescence intensity area, a plurality of photoluminescence colors, and a plurality of color scale values;
(3) constituting a three-dimensional coordinate system by adding a wavelength axis into a two-dimensional coordinate system, and then filling the plurality of (x,y) coordinate positions, the plurality of wavelength values, the plurality of values of integrated photoluminescence intensity area into the three-dimensional coordinate system, so as to construct a 3D pattern in the three-dimensional coordinate system;
(4) filling the plurality of (x,y) coordinate positions, the plurality of photoluminescence colors, and the plurality of color scale values into the two-dimensional coordinate system, such that a 2D color-scale pattern is formed in the two-dimensional coordinate system; and
(5) the 2D color-scale pattern and the 3D pattern being respectively used as an information carrying label and a security verification, or being respectively adopted as the security verification and the information carrying label.

Moreover, for achieving the primary objective of the present invention, the inventor of the present invention provides one embodiment for the anti-counterfeit security verification device using quantum dots, comprising:
a base;
a plurality of receiving recesses, being formed on the base; and
a plurality of optical members, being respectively disposed in the plurality of receiving recesses; wherein each of the plurality of optical members comprises a polymer matrix and a plurality of quantum dots (QDs) spread in or enclosed by the polymer matrix;

wherein the plurality of optical members irradiate a plurality of photoluminescent lights after being illuminated by a short-wavelength light, and each of the plurality of photoluminescent lights having at least one wavelength value, one (x, y) coordinate position, one value of integrated photoluminescence intensity area, one photoluminescence color, and one color scale value;

wherein the plurality of (x,y) coordinate positions, the plurality of wavelength values, and the plurality of values of integrated photoluminescence intensity area constitute a 3D pattern in a three-dimensional coordinate system, and the three-dimensional coordinate system is established by adding a wavelength axis into a two-dimensional coordinate system; and wherein the plurality of (x,y) coordinate positions, the plurality of photoluminescence colors, and the plurality of color scale values form a 2D color-scale pattern in the two-dimensional coordinate system.

The inventor of the present invention further provides another one embodiment for the anti-counterfeit security verification device using quantum dots, comprising:

an inner enclosing body; and a plurality of optical layers, being enclosed by the inner enclosing body, wherein each of the optical layers comprises a plurality of optical members, and each of the plurality of optical members comprising a polymer matrix and a plurality of quantum dots (QDs) spread in or enclosed by the polymer matrix;

wherein the plurality of optical layers are stacked in the inner enclosing body to constitute a 3D object, and the 3D object irradiates a plurality of photoluminescent lights after being illuminated by a short-wavelength light;

wherein each of the plurality of photoluminescent lights has at least one wavelength value, one (x, y) coordinate position, one value of integrated photoluminescence intensity area, one photoluminescence color, and one color scale value;

wherein the plurality of (x,y) coordinate positions, the plurality of wavelength values, and the plurality of values of integrated photoluminescence intensity area constitute a 3D pattern in a three-dimensional coordinate system, and the three-dimensional coordinate system is established by adding a wavelength axis into a two-dimensional coordinate system; and wherein the plurality of (x,y) coordinate positions, the plurality of photoluminescence colors, and the plurality of color scale values form a 2D color-scale pattern in the two-dimensional coordinate system.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an anti-counterfeit security verification method and device using quantum dots disclosed by the present invention, embodiments of the present invention will be described in detail with reference to the attached drawings hereinafter.

First Embodiment of Anti-Counterfeit Security Verification Device

Figure 2:
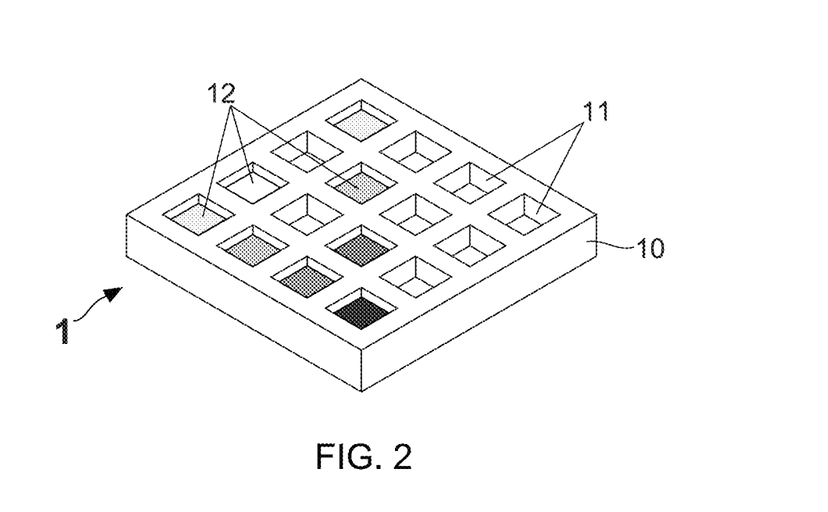
FIG. 2 shows a stereo diagram of an anti-counterfeit security verification device according to the present invention.
Figure 3:
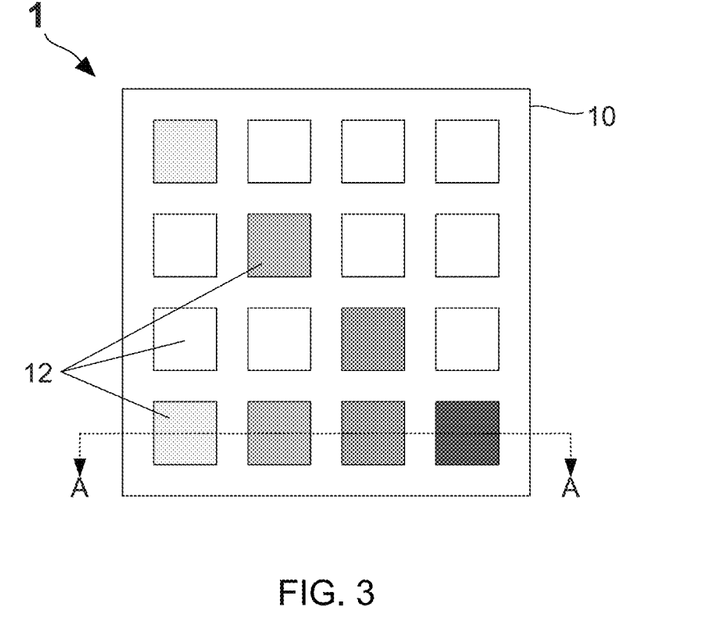
FIG. 3 shows a first top-view diagram of the anti-counterfeit security verification device.

With reference to FIG. 2, there is shown a stereo diagram of an anti-counterfeit security verification device according to the present invention. Moreover, FIG. 3 and FIG. 4 respectively show a first top-view diagram and a cross-sectional view of the anti-counterfeit security verification device, wherein the cross-sectional profile of the anti-counterfeit security verification device 1 is exhibited by cutting the anti-counterfeit security verification device 1 along a profile cutting line A-A marked in FIG. 3. In first embodiment, the anti-counterfeit security verification device 1 comprises: a base 10, a plurality of receiving recesses 11 formed on the base 10, and a plurality of optical members 12, wherein an amount number of the plurality of optical members 12 is equal to or less than an amount number of the plurality of receiving recesses 11, such that each of the plurality of optical members 12 can be disposed in one corresponding receiving recesses 11. According to the particular design of the present invention, each of the plurality of optical members 12 comprises a polymer matrix 121 and a plurality of quantum dots (QDs) 122 spread in or enclosed by the polymer matrix 121, wherein a manufacturing material of the polymer matrix 121 is selected from the group consisting of polydimethylsiloxane (PDMS), polystyrene (PS), polyethylene terephthalate (PET), polycarbonate (PC), cyclo olefin copolymer (COC), cyclic block copolymer (CBC), polylactic acid (PLA), polyimide (PI), polyester, polyurethanes (PU), polyvinyl chloride (PVC), polypropylene (PP), and a combination of two or more of the foregoing materials.

Figure 4:
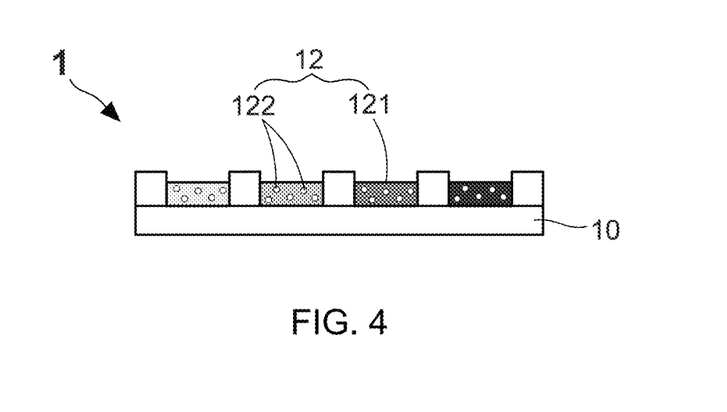
FIG. 4 shows a cross-sectional view of the anti-counterfeit security verification device.

The QDs 122 can be green QDs, red QDs, or a combination of two of the foregoing QDs. It is worth further explaining that, the red QDs have a particle size in a range between 5 nm and 20 nm, and the particle size of the green QDs is in a range from 2 nm to 10 nm. Exemplary materials of the QDs 122 are listed in following Table (1).

TABLE (1)

| Types of quantum dot (QD) | Corresponding exemplary material |
| --- | --- |
| Group II-VI compounds | CdSe or CdS |
| Group III-V compounds | (Al, In, Ga)P, (Al, In, Ga)As, or (Al, In. Ga)N |
| Group III-V compounds having core-shell structure | CdSe/ZnS core-shell QD |
| Group III-V compounds having core-shell structure | InP/ZnS core-shell QD |
| Group II-VI compounds having non-spherical alloy structure | ZnCdSeS |

Figure 5:
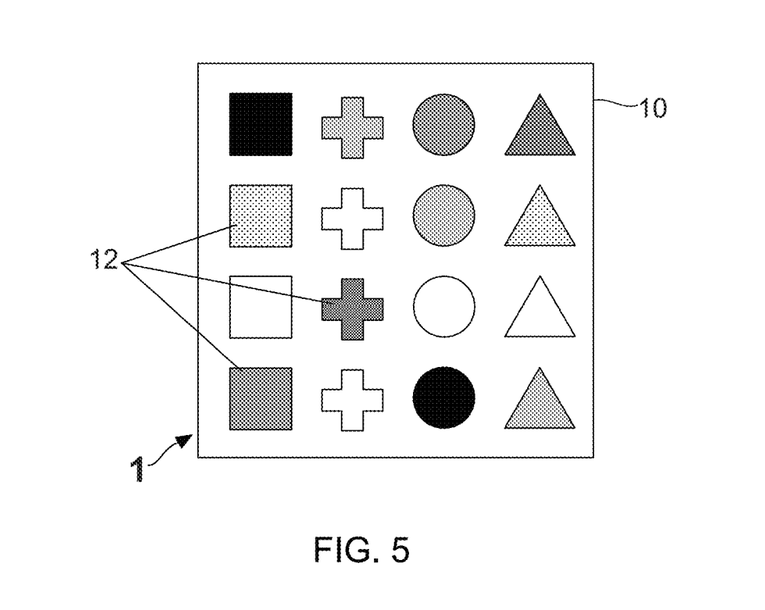
FIG. 5 shows a second top-view diagram of the anti-counterfeit security verification device.

FIG. 5 shows a second top-view diagram of the anti-counterfeit security verification device. After comparing FIG. 5 with FIG. 3, it is understood that the present invention does not particularly limit the top-view shape of the receiving recess 11, such that each of plurality of receiving recesses 11 may has a specific top-view shape selected from the group consisting of circular shape, oval shape, square shape, rectangle shape, trapezoid shape, triangle shape, polygonal shape, and a combination of two or more of the foregoing shapes.

Anti-Counterfeit Security Verification Method

Figure 6:
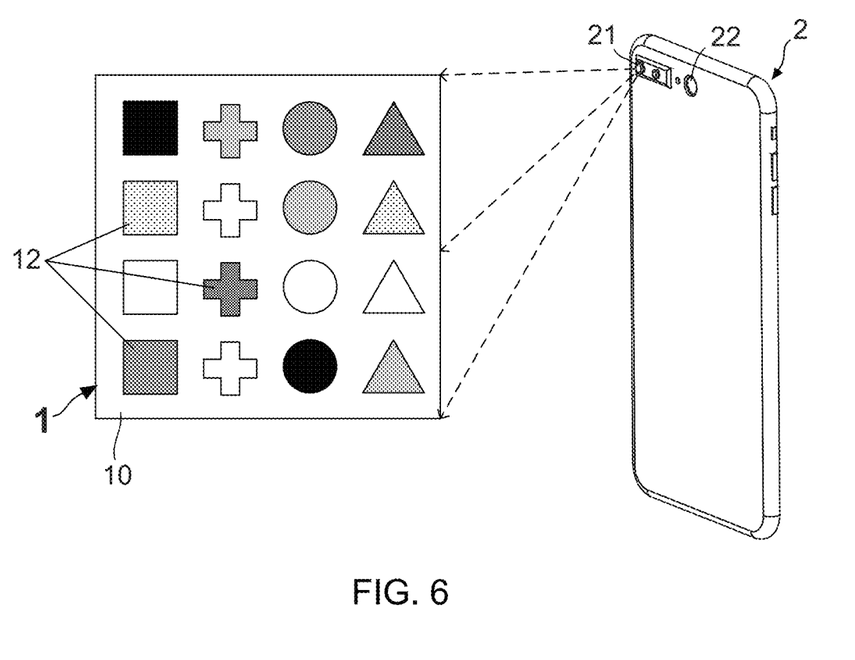
FIG. 6 shows a first exemplary application diagram of the anti-counterfeit security verification device.
Figure 7:
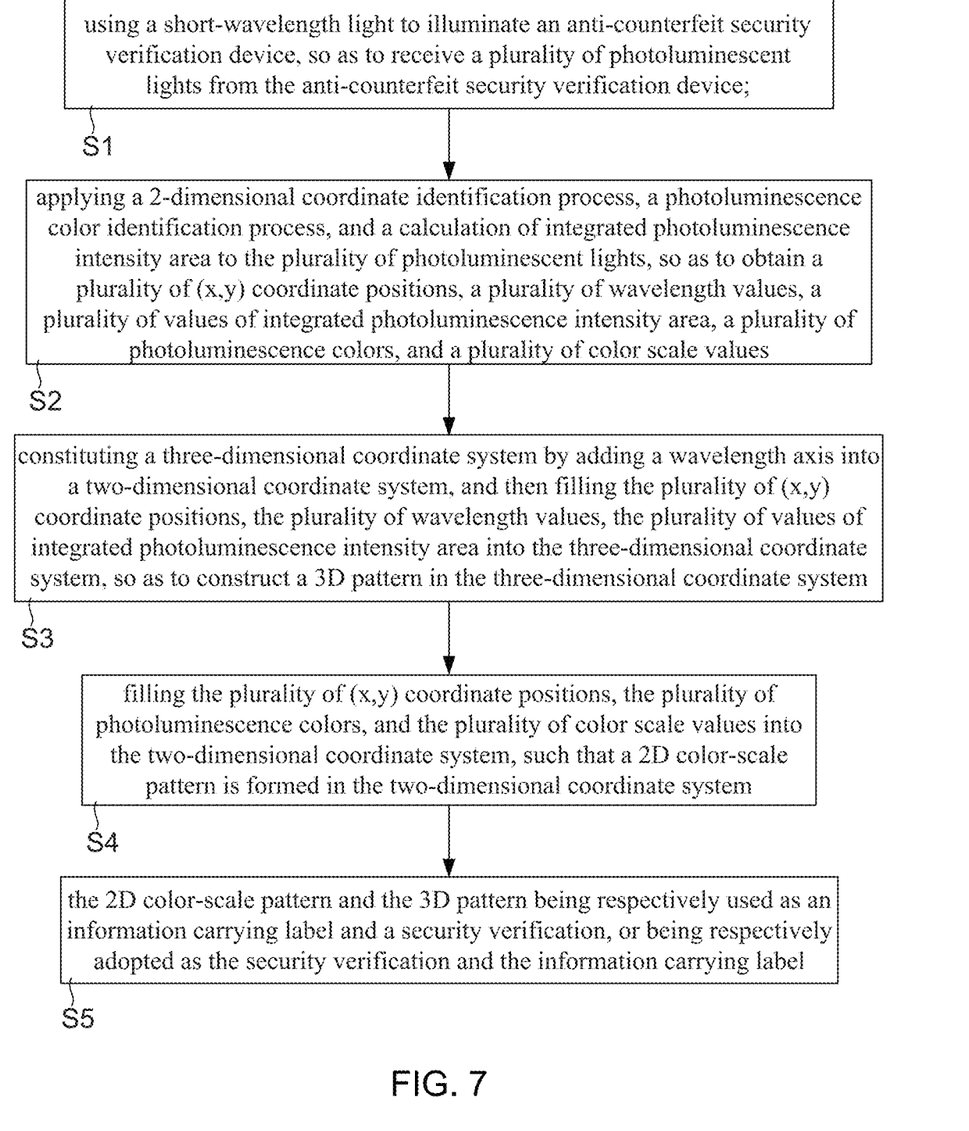
FIG. 7 shows a flow chart diagram of an anti-counterfeit security verification method according to the present invention.

FIG. 6 shows a first exemplary application diagram of the anti-counterfeit security verification device, and FIG. 7 shows a flow chart diagram of an anti-counterfeit security verification method according to the present invention. The method of anti-counterfeit security verification mainly comprises 5 execution steps. First of all, step S1 is executed for using a short-wavelength light to illuminate an anti-counterfeit security verification device 1, so as to receive a plurality of photoluminescent lights from the anti-counterfeit security verification device 1. FIG. 6 depicts that a smart phone 2 is used for using a light emitting module 21 to produce the short-wavelength light to illuminate the anti-counterfeit security verification device 1. However, that should not be regarded as a limitation for a first electronic device (such as the smart phone 2) capable of producing the short-wavelength light to illuminate the anti-counterfeit security verification device 1. In practical application, the first electronic device can also be a luminous device, a light emitting member, a camera device, a smart phone, a tablet PC, or a computer integrated with camera module.

The method subsequently proceeds to step S2, so as to apply a 2-dimensional coordinate identification process, a photoluminescence color identification process, and a calculation of integrated photoluminescence intensity area to the plurality of photoluminescent lights. Therefore, there are a plurality of (x,y) coordinate positions, a plurality of wavelength values, a plurality of values of integrated photoluminescence intensity area, a plurality of photoluminescence colors, and a plurality of color scale values obtained. Herein, it needs to further explain that, a second electronic device is configured for completing the 2-dimensional coordinate identification process, the photoluminescence color identification process, and the calculation of integrated photoluminescence intensity area in the step S2, and the said second electronic device can be a light measuring device, a smart phone, a tablet PC, a laptop PC, a desk PC, or an all-in-one PC.

Figure 8:
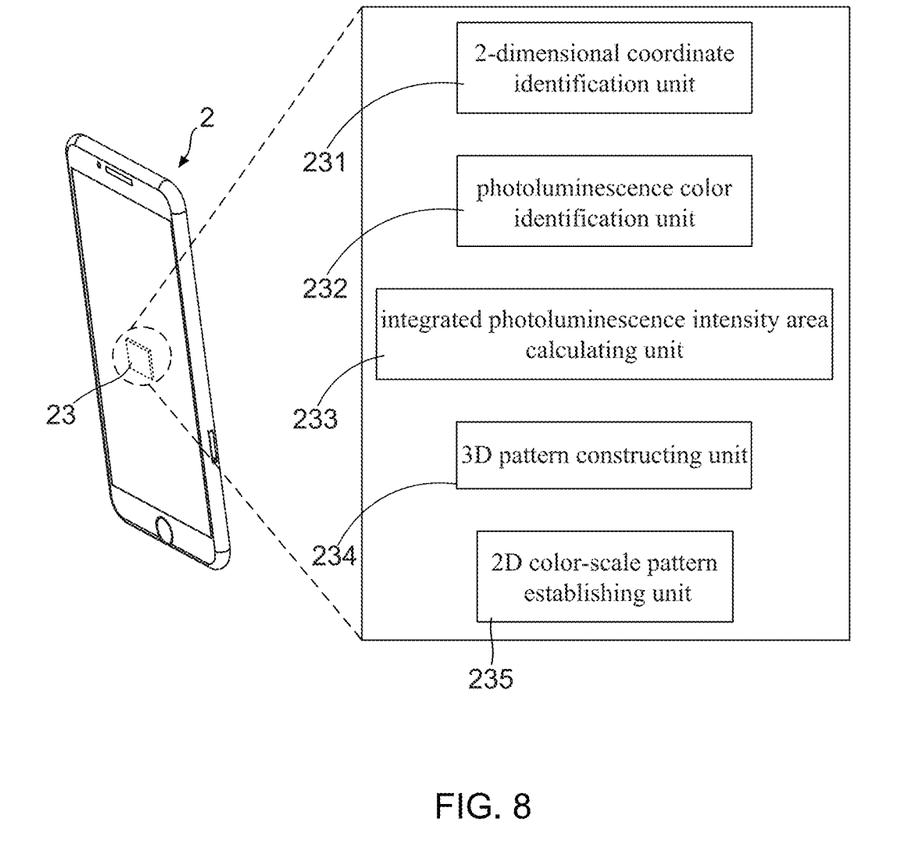
FIG. 8 shows a stereo diagram of a smart phone.

FIG. 8 shows a stereo diagram of a smart phone. From FIG. 6 and FIG. 8, it is understood that, the smart phone 2 can not only be used in the step S1 for being as the first electronic device, but also adopted for being the second electronic device in the step S2. However, while being configured to be the second electronic device, the smart phone 2 must be provided with a 2-dimensional coordinate identification unit 231, a photoluminescence color identification unit 232, an integrated photoluminescence intensity area calculating unit 233, a 3D pattern constructing unit 234, and a 2D color-scale pattern establishing unit 235. By such arrangements, the smart phone 2 is able to complete the 2-dimensional coordinate identification process, the photoluminescence color identification process, and the calculation of integrated photoluminescence intensity area after receiving the plurality of photoluminescent lights irradiated from the plurality of optical members 12.

Figure 9:
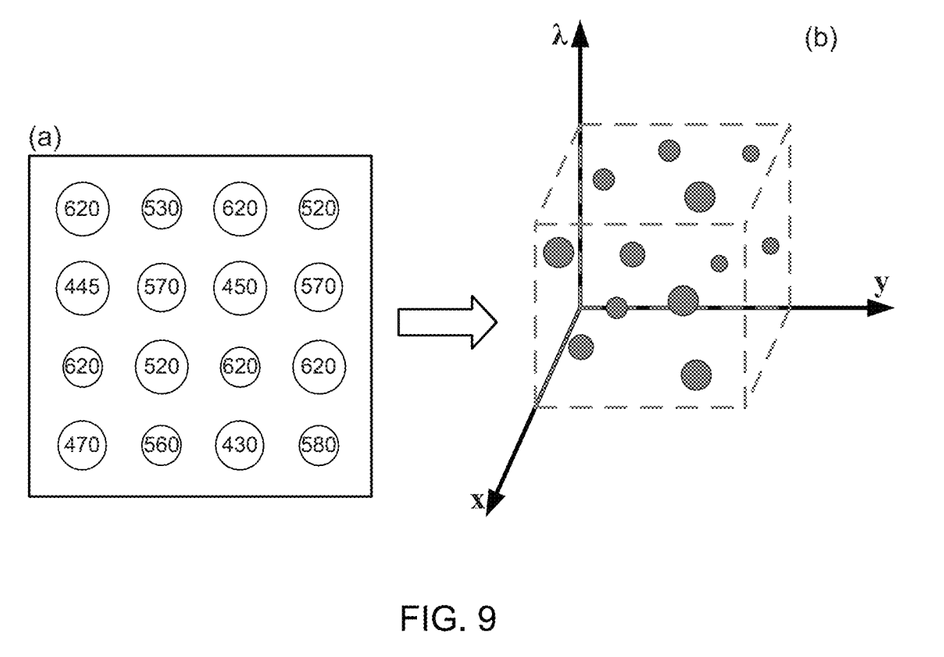
FIG. 9 shows a three-dimensional coordinate system.

Subsequently, the method proceeds to step S3, so as to fill the plurality of (x,y) coordinate positions, the plurality of wavelength values, the plurality of values of integrated photoluminescence intensity area into the three-dimensional coordinate system for constructing a 3D pattern in the three-dimensional coordinate system. FIG. 9 shows a three-dimensional coordinate system. From FIG. 9, it is understood that the three-dimensional coordinate system is established by adding a wavelength axis into a two-dimensional coordinate system. Moreover, diagram (a) of FIG. 9 also depicts that the plurality of wavelength values, (x, y) coordinate positions and values of integrated photoluminescence intensity area are firstly filling into or labeled on the said two-dimensional coordinate system before three-dimensional coordinate system is established. It is worth noting that, because there is an amount ways of $2^{10} \times 2^{10} \times 2^{10}$ to encode the (x, y) coordinate positions, the wavelength values, and the values of integrated photoluminescence intensity area filling into or labeled on the said three-dimensional coordinate system, a 3D pattern constructed in the three-dimensional coordinate system would has high-security code.

Figure 10:
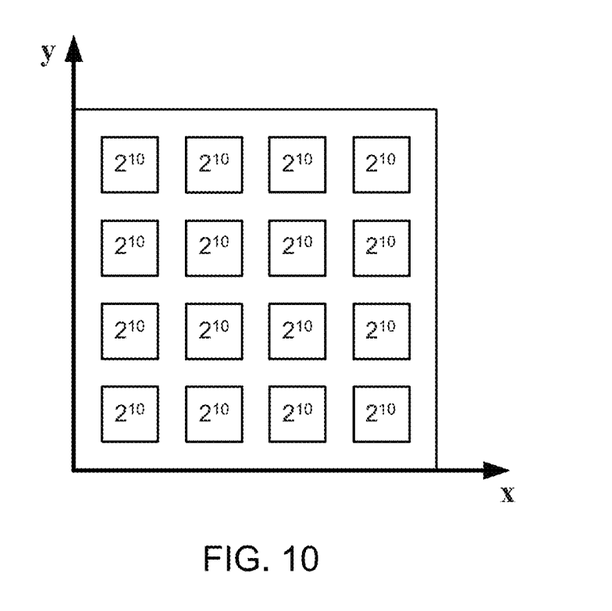
FIG. 10 shows the two-dimensional coordinate system.

Besides, the photoluminescence colors and their corresponding color scale values can also be encoded. In step S4 of the flow chart, it is filled the plurality of (x,y) coordinate positions, the plurality of photoluminescence colors, and the plurality of color scale values into the two-dimensional coordinate system, such that a 2D color-scale pattern is formed in the two-dimensional coordinate system. FIG. 10 shows the two-dimensional coordinate system. For example, each of three original colors (i.e., RGB) certainly has a color scale value in a range from $2^0$ to $2^{10}$. Therefore, there is an amount ways of $2^{10} \times 2^{10} \times 2^{10} \times 2^{10}$ to encode the (x, y) coordinate positions, the color scale value of red photoluminescent light, the color scale value of green photoluminescent light, and the color scale value of blue photoluminescent light. However, there would be 1000 types of wavelength combinations if the photoluminescent light simultaneously has two or above wavelengths. In this case, there is an amount ways of $2^{10} \times 2^{10} \times 2^{10} \times 2^{10} \times (1000^{1024})^n$ to encode the 2D color-scale pattern.

Second Embodiment of Anti-Counterfeit Security Verification Device

Figure 11:
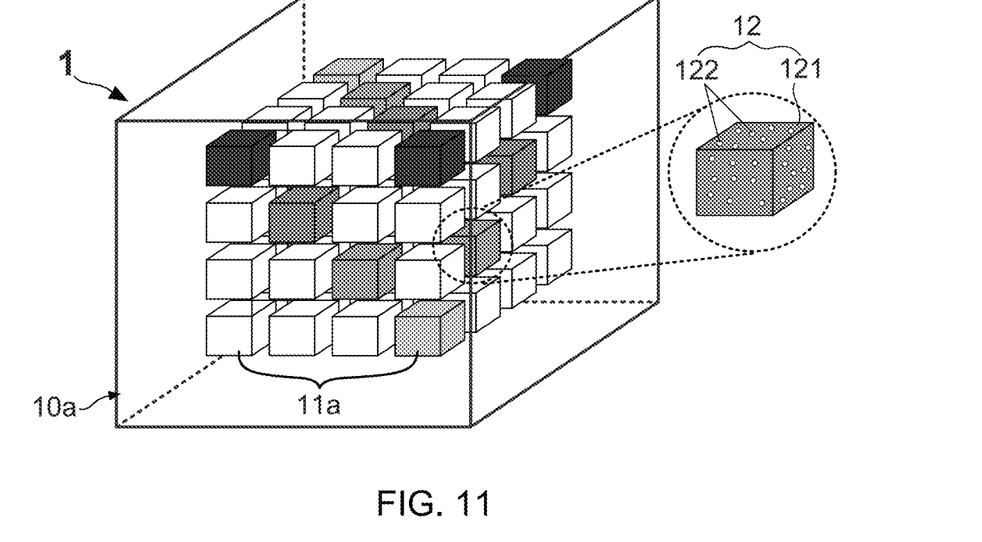
FIG. 11 shows a stereo diagram of the anti-counterfeit security verification device according to the present invention.

With reference to FIG. 11, there is shown a stereo diagram of the anti-counterfeit security verification device according to the present invention. After comparing FIG. 11 with FIG. 2, it is understood that the second embodiment of the anti-counterfeit security verification device 1 does not has the base 10. In the second embodiment, the plurality of optical members 12 are arranged to form a plurality of optical layers 11*a*, wherein the plurality of optical layers 11*a* are enclosed by an inner enclosing body 10*a*, and each of the plurality of optical members 12 also comprises a polymer matrix 121 and a plurality of quantum dots (QDs) 122.

Particularly, the plurality of optical layers 11*a* are stacked in the inner enclosing body 10*a* to constitute a 3D object, such as a sphere body, an elliptical sphere body, a cube body, a cuboid body, a trapezoid body, a triangle body, a polyhedron body, or a combination of two or more of the foregoing bodies. For example, FIG. 11 depicts that the 3D object is a cubic body. Therefore, it is extrapolated that, the 3D object irradiates a plurality of photoluminescent lights after being illuminated by a short-wavelength light. Consequently, as FIG. 9 and FIG. 10 show, wherein the plurality of (x,y) coordinate positions, the plurality of wavelength values, and the plurality of values of integrated photoluminescence intensity area constitute a 3D pattern in a three-dimensional coordinate system. Moreover, the plurality of (x,y) coordinate positions, the plurality of photoluminescence colors, and the plurality of color scale values form a 2D color-scale pattern in the two-dimensional coordinate system.

Exemplary Application of the Second Embodiment

Figure 12:
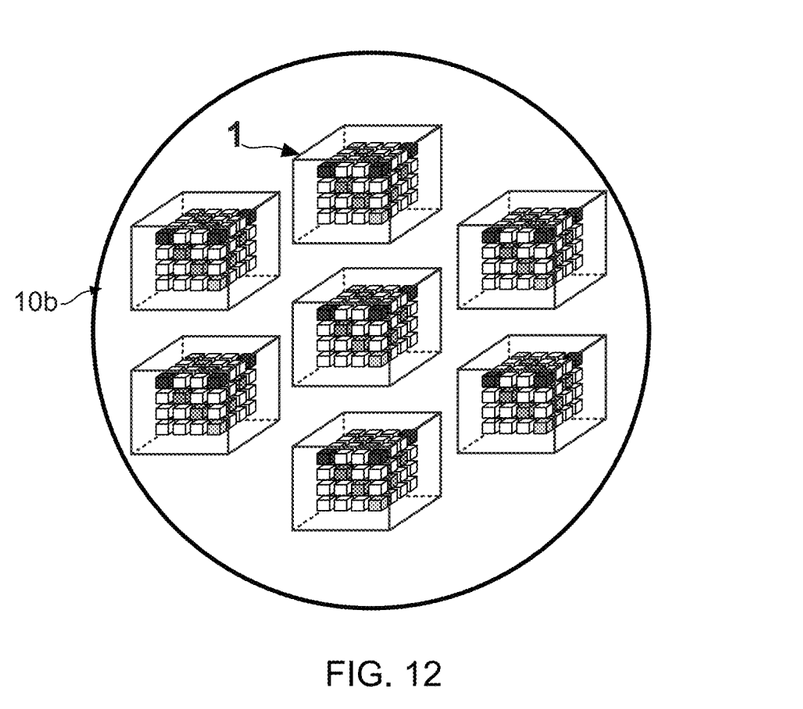
FIG. 12 and FIG. 13 show schematic diagrams for describing exemplary applications of the anti-counterfeit security verification device.
Figure 13:
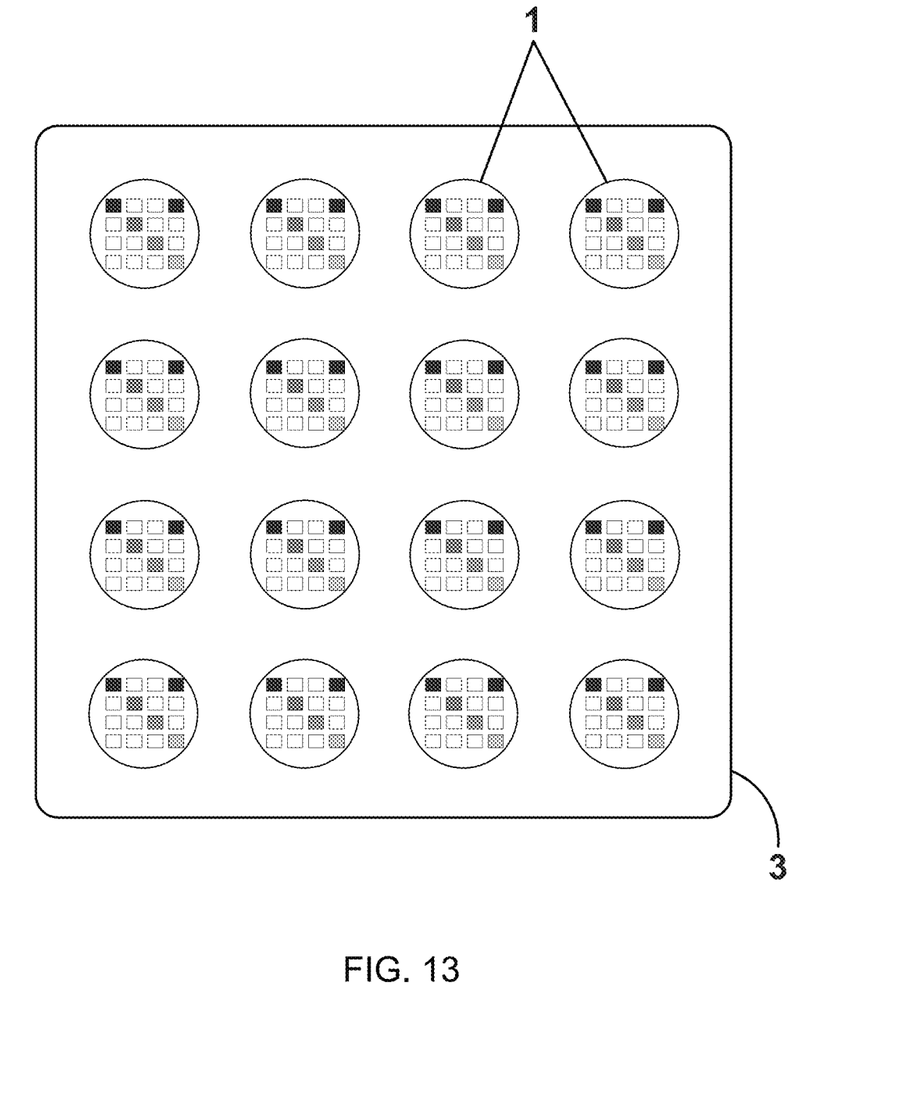

FIG. 12 and FIG. 13 show schematic diagrams for describing exemplary applications of the anti-counterfeit security verification device. FIG. 12 depicts that the inner enclosing body 10a enclosed with a plurality of optical layers 11a can be firstly enclosed an outer enclosing body 10b, and then the anti-counterfeit security verification device 1 of the present invention can be further applied to a product 3. Both the outer enclosing body 10b and the inner enclosing body 10a can be made of a manufacturing material selected from the group consisting of silicone, poly(methyl methacrylate) (PMMA), polycarbonate (PC), polyvinyl chloride (PVC), polystyrene (PS), polyethylene terephthalate (PET), epoxy, and a combination of two or more of the foregoing materials. It is worth noting that, FIG. 13 depicts that the product 3 integrated with multi anti-counterfeit security verification devices 1, and each of the anti-counterfeit security verification devices 1 has one specific 2D color-scale pattern and one specific 3D pattern, such that the product 3 would has a high-security information carrying label with complex security verification codes.

The above description is made on embodiments of the present invention. However, the embodiments are not intended to limit scope of the present invention, and all equivalent implementations or alterations within the spirit of the present invention still fall within the scope of the present invention.

What is claimed is:

1. An anti-counterfeit security verification device, comprising:
    an inner enclosing body; and
    a plurality of optical layers, being enclosed by the inner enclosing body, wherein each of the optical layers comprises a plurality of optical members, and each of the plurality of optical members comprising a polymer matrix and a plurality of quantum dots (QDs) spread in or enclosed by the polymer matrix;
    wherein the plurality of optical layers are stacked in the inner enclosing body to constitute a 3D object, and the 3D object irradiating a plurality of photoluminescent lights after being illuminated by a short-wavelength light;
    wherein each of the plurality of photoluminescent lights has one wavelength value, one (x, y) coordinate position, one integrated photoluminescence intensity value, one photoluminescence color, and one color scale value;
    wherein the plurality of (x,y) coordinate positionsp and the plurality of wavelength values are formed a plurality of coordinate points in a three-dimensional coordinate system, and the three-dimensional coordinate system being established by adding a wavelength axis into a two-dimensional coordinate system; and
    wherein each of the plurality of coordinate points has a dot size value, and the plurality of dot size values being proportional to the plurality of integrated photoluminescence intensity values, respectively.

2. The anti-counterfeit security verification device of claim 1, wherein a manufacturing material of the polymer matrix is selected from the group consisting of polydimethylsiloxane (PDMS), polystyrene (PS), polyethylene terephthalate (PET), polycarbonate (PC), cyclo olefin copolymer (COC), cyclic block copolymer (CBC), polylactic acid (PLA), polyimide (PI), polyester, polyurethanes (PU), polyvinyl chloride (PVC), polypropylene (PP), and a combination of two or more of the foregoing materials.

3. The anti-counterfeit security verification device of claim 1, further comprising an outer enclosing body for enclosing the inner enclosing body.

4. The anti-counterfeit security verification device of claim 1, wherein a manufacturing material of the QDs is selected from the group consisting of Group II-VI compounds, Group III-V compounds, Group II-VI compounds having core-shell structure, Group III-V compounds having core-shell structure, Group II-VI compounds having non-spherical alloy structure, and a combination of two or more of the foregoing compounds.

5. The anti-counterfeit security verification device of claim 1, wherein the 3D object is selected from the group consisting of sphere body, elliptical sphere body, cube body, cuboid body, trapezoid body, triangle body, polyhedron body, and a combination of two or more of the foregoing bodies.

6. The anti-counterfeit security verification device of claim 3, wherein both the outer enclosing body and the inner enclosing body are made of a manufacturing material selected from the group consisting of silicone, poly(methyl methacrylate) (PMMA), polycarbonate (PC), polyvinyl chloride (PVC), polystyrene (PS), polyethylene terephthalate (PET), epoxy, and a combination of two or more of the foregoing materials.

* * * * *